No. 770,337. PATENTED SEPT. 20, 1904.
H. TERSLING.
MACHINE FOR CLEANSING BOTTLES.
APPLICATION FILED FEB. 12, 1903.
NO MODEL. 8 SHEETS—SHEET 5.

No. 770,337. PATENTED SEPT. 20, 1904.
H. TERSLING.
MACHINE FOR CLEANSING BOTTLES.
APPLICATION FILED FEB. 12, 1903.
NO MODEL. 8 SHEETS—SHEET 6.

No. 770,337. PATENTED SEPT. 20, 1904.
H. TERSLING.
MACHINE FOR CLEANSING BOTTLES.
APPLICATION FILED FEB. 12, 1903.
NO MODEL. 8 SHEETS—SHEET 8.

No. 770,337. Patented September 20, 1904.

UNITED STATES PATENT OFFICE.

HILMAR TERSLING, OF COPENHAGEN, DENMARK.

MACHINE FOR CLEANSING BOTTLES.

SPECIFICATION forming part of Letters Patent No. 770,337, dated September 20, 1904.

Application filed February 12, 1903. Serial No. 143,141. (No model.)

*To all whom it may concern:*

Be it known that I, HILMAR TERSLING, a citizen of the Kingdom of Denmark, residing at Copenhagen, Denmark, have invented certain new and useful Improvements in Machines for Cleansing Bottles, of which the following is a specification.

The present invention relates to a machine for cleansing bottles or other hollow ware, and has for its object by an automatic and continuous motion of the bottle through the machine to limit the work accomplished by hand as much as possible, while at the same time effecting the cleansing with the necessary thoroughness.

The main parts of the machine are an introduction mechanism by means of which the bottles are carried through a scraping apparatus in which labels, &c., are scraped off and then to a brush and flush apparatus, where they are rotated while simultaneously being worked inside and outside with brushes and flushed with water and from where, by means of carriers, they are transported to a drain-off apparatus, where the bottles are finally rinsed, drained off, and then removed from the machine.

As will be appreciated, the inventive idea is susceptible of many different mechanical expressions, one of which is illustrated in the accompanying drawings.

In the embodiment of the invention herein shown.

Figure 1:
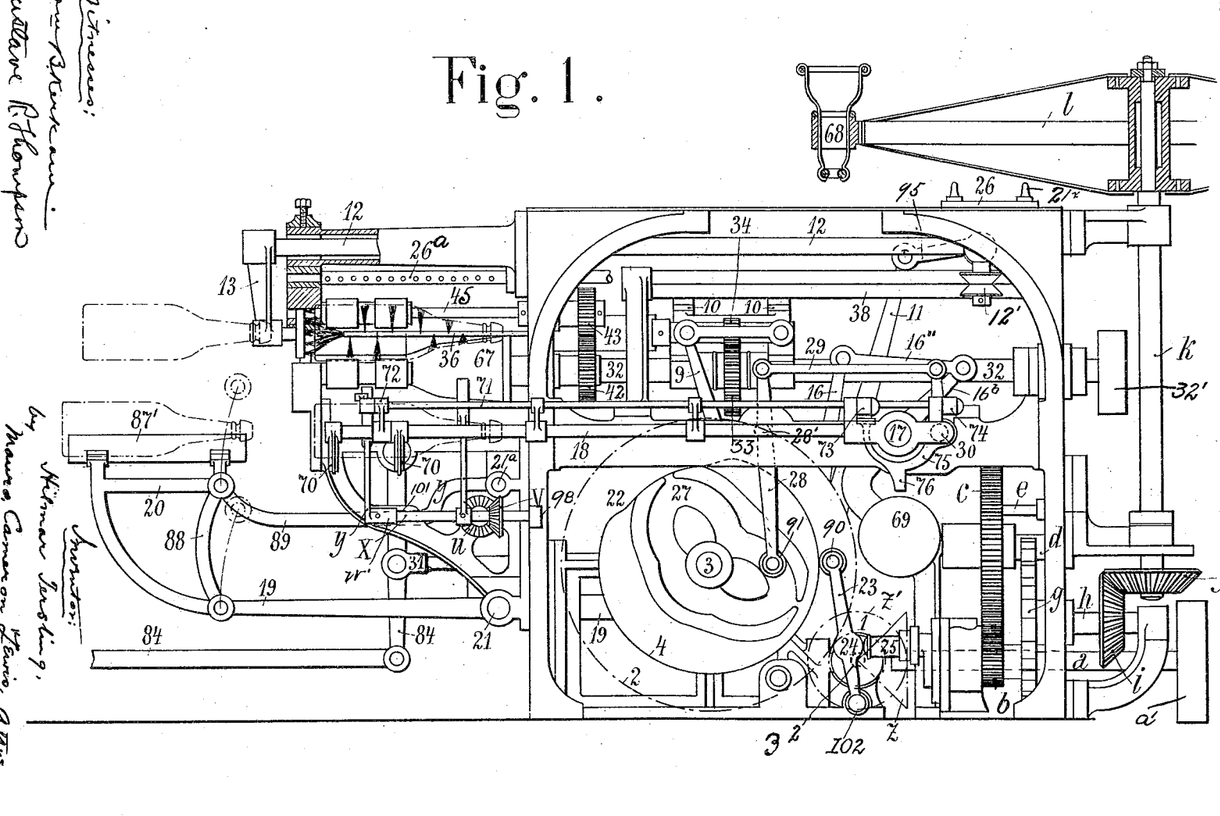
Figure 1 is a side elevation of the machine.
Figure 9:
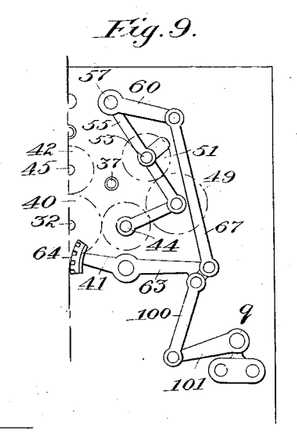
Fig. 9 is a similar view of the mechanism on the inner face of the other half of said front wall.
Figure 12:
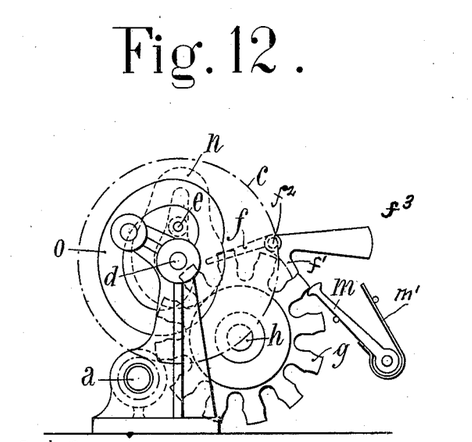
Figs. 12 and 16 are details of portions of the driving mechanism.
Figure 16:
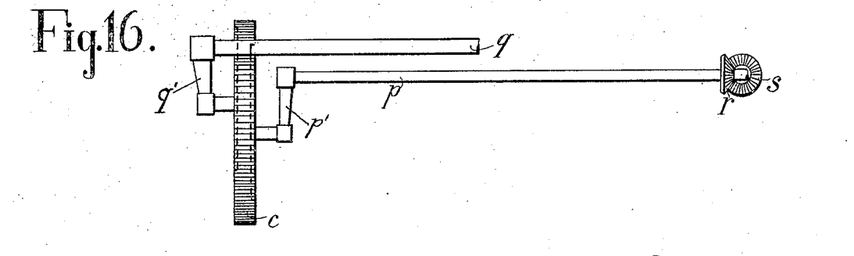

The machine is operated by means of a belt engaging pulley $a'$ and actuating a driving-axle $a$, Fig. 1, supplied with a pinion $b$, meshing with gear-wheel $c$, fixed on a short axle $d$. Gear-wheel $c$ has a projecting pin $e$, Figs. 1 and 12, which by the revolution of said wheel actuates one arm of a lever $f$, pivoted at $f^2$, the other arm, $f'$, of which constitutes a pawl for a cog-wheel $g$, Figs. 1 and 12. $f^3$ is a counterweight on the lever $f$. The cog-wheel $g$ has twelve teeth, and after the projecting pin $e$ has depressed arm $f$, thus elevating pawl $f'$ from between the teeth of wheel $g$, said pin will engage between two of the teeth of wheel $g$ and carry it forward one cog for every revolution of the wheel $c$. The axle $h$ of wheel $g$ transmits, by means of two equal conical pinions $i$ and $j$, a step-by-step movement to a vertical axle $k$, Fig. 1, which at its upper end supports the drain-off apparatus. When the wheel $g$ is carried forward one cog, the drain-off apparatus $l$ will consequently be revolved one-twelfth of a revolution. The wheel $g$ is prevented from moving backward by means of a counter-pawl $m$, Fig. 12, governed by a spring $m'$. The cog-wheels $c$ besides carrying the above-mentioned projecting pin $e$ is furthermore on either side supplied with cam-grooves $n$ and $o$, Figs. 12 and 16, in which are guided crank-shaped arms $p'$ $q'$, firmly connected with the axles $p$ and $q$, a short backward-and-forward movement of rotation being thereby imparted to these axles upon the revolution of wheel $c$. The other end of the axle $p$ is supplied with a conical pinion $r$, Figs. 2 and 3, which, through pinion $s$, axle $t$, and pinions $u$ and $v$, transmit the same motion to an axle $x$, Figs. 1, 2, and 3, having bearings 98 and 101, Fig. 1. In Fig. 1 is seen pinions $u$ $v$ and shaft $x$ only. The axles $p$ and $x$ are each supplied with a cradle consisting of two fork-shaped uprights $y$, Figs. 1, 2, and 3, serving as a bed for the bottles while being conveyed from the flush mechanism to the transporters. Through the described motion of the axles $p$ and $x$ the cradles $y$ receive a rocking movement from the vertical position in which they receive the bottles to the slanting position in which they deliver these bottles to the transporters, after which they again take up a vertical position. The axle $q$ has its bearing in the front wall of the machine, Fig. 9, and exterior to this wall it is connected to mechanism hereinafter described which delivers the bottles from the flush mechanism down into the above-mentioned cradles.

Figure 10:
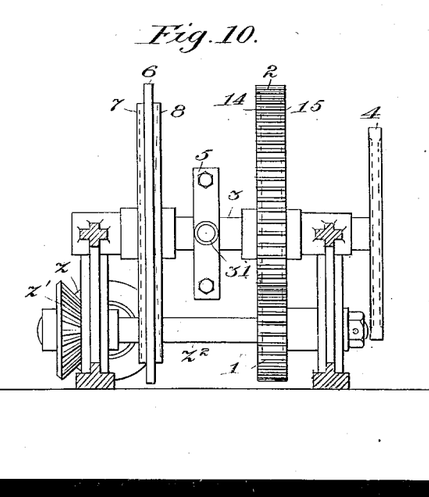
Fig. 10 is a detail view of the cam-shaft and the associated mechanism for imparting movements to the several parts of the machine.
Figures 17, 18:
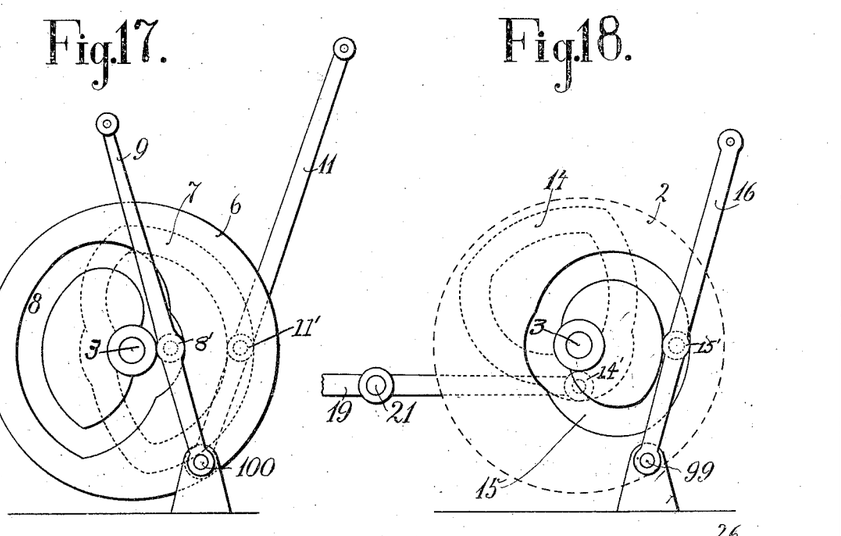
Figs. 17 and 18 are details of actuating-cams.
Figures 19, 20, 21:
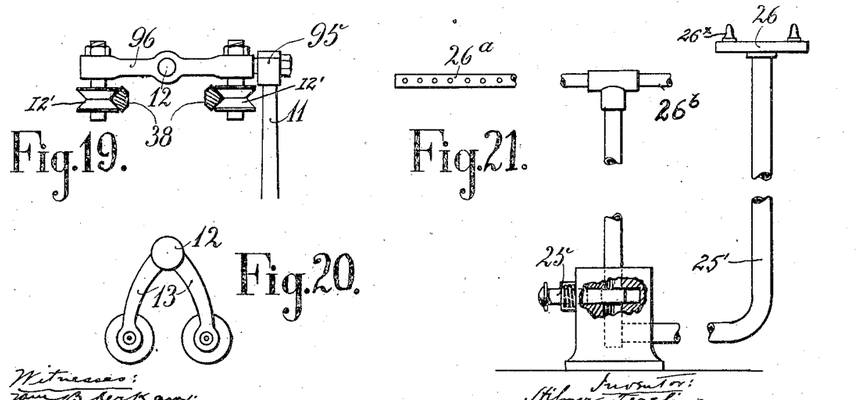
Figs. 19 and 20 are detail views of part of the mechanism through which movement is imparted to the brushes which engage the ends of the bottles.
Fig. 21 is a detail of the pipe connections for the water-spraying means.
Figure 22:
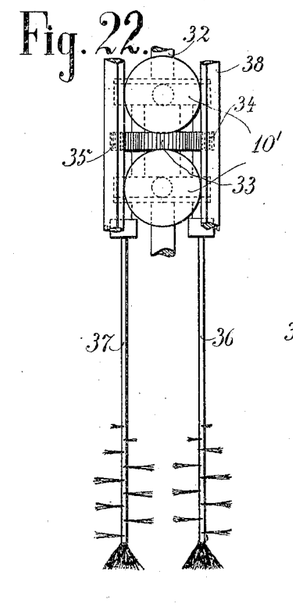
Figs. 22, 23, 24, and 25 are detail views of the mechanism for operating the brushes which clean the interior of the bottles.

The driving-axle $a$, Fig. 1, is at its foremost end supplied with a conical pinion $z$, Figs. 1 and 10, which meshes with another conical pinion $z'$ of the same size mounted on shaft $z^2$, and thus effects the rotation of said shaft. A pinion 1, mounted on this shaft, meshes with a large gear-wheel 2, mounted on shaft 3, Figs. 1 and 10, and having cam-grooves, hereinafter referred to. The shaft 3 is supplied with gear-wheels 2, 4, and 6 and eccentric 5, Fig. 10. The cam-wheel 6, Figs. 10 and 17, is on either side supplied with grooves 7 and 8. In groove 8 is guided a roller $8'$, fixed on lever 9, pivoted at 100, through which the brush-guide 10, hereinafter described, receives a backward-and-forward motion. A roller $11'$ on lever 11 engages in groove 7, by which the rod 12, through connecting-rods 95 and 96, Figs. 1 and 19, receives a backward-and-forward motion likewise. Rod 12 is in its free end supplied with depending arms 13, Figs. 1, 3, and 20, the ends of which are supplied with stiff brushes which engage the bottoms of the bottles in the lifting apparatus hereinafter described and force said bottles therefrom into the flush mechanism. For the rest these brushes act to brush the bottoms of the bottles during their rotation.

Gear-wheel 2, Figs. 10 and 18, is on either side supplied with grooves 14 and 15. In groove 15 is guided a roller $15'$, which through lever 16, pivoted at 99, and link $16''$, Fig. 1, actuates the horizontal axle 17, running transversely through the machine, Figs. 1 and 3, a one-fourth revolution backward and forward. The axle 17 is at each end outside the frame of the machine supplied with a transporter 18, Figs. 1 and 3, which through the motion of the axle is brought from the horizontal position in which it receives the bottles from the cradles $y$ to the vertical position in which it delivers the bottles to the rinsing and drain-off apparatus $l$, Fig. 1. The transporters will be described later on. In groove 14 engages a roller $14'$, fixed to one end of a two-armed lever 19, Figs. 1 and 18, the other end of which forms part of the above-named lifting apparatus 20. The lever 19 pivots around axis 21, and the end of the lever connected with the above-named lifting apparatus has imparted thereto, through the engagement of the other end in groove 14, an up-and-down movement on its axis by which the lifting apparatus carry the bottles after they have gone through the scraping apparatus up in front of the arms 13, which deliver them into the flush mechanism.

Figure 7:
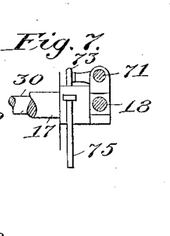

The cam-wheel 4, Fig. 1, is not quite circular, but has in its circumference a cut-away portion 22. A roller 90, bearing against the edge of said cam-wheel, is fixed to the free end of lever 23, pivoted at 102, which by means of enlargement 24 actuates a valve 25 to secure the final flushing of the bottles. Valve 25 governs a water-pipe $25'$, Fig. 21, which has its outlets above in chamber 26, Figs. 1, 2, 3, and 21, having two openings or nozzles $26^\times$, which when the drain-off mechanism is at rest are just beneath two bottles. When the roller on lever 23 engages cut-away portion 22, the valve is closed, which is the case when the drain-off apparatus is rotating, when, on the other hand, the roller leaves the cut-away portion the valve is opened and the water is injected into the bottles through said nozzles $26^\times$. From the water-pipe leading to valve 25 another pipe $26^a$, Fig. 1, branches off and is arranged above the brush 67, hereinafter described. This pipe $26^a$ is perforated and is in direct connection with a water-supply $26^b$, so that water may continuously flow therethrough, thereby keeping the brush and the bottles constantly flushed. The cam-wheel 4 has furthermore on its exterior a groove 27, Fig. 1. In this engages a roller 91 on one end of the two-armed lever 28, pivoted at $28'$, which by means of link connection 29 is capable of rotating axle 30, Figs. 1 and 3, a short distance backward and forward. This axle, which is parallel with the axle 17 and like it extends transversely through the machine, at each end supports the apparatus (shown in Figs. 4 and 7) for opening the arm of the transporter, which will be more fully described hereinafter.

Figure 3:
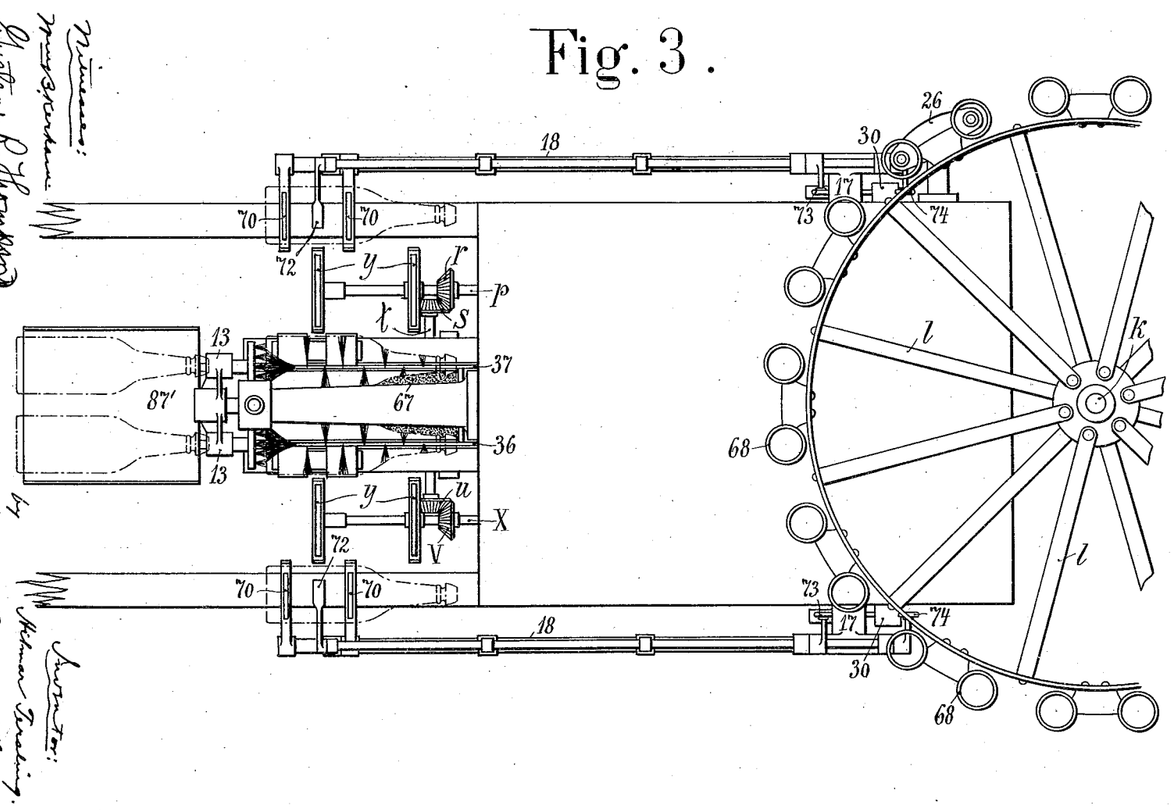
Fig. 3, a plan view of the machine.
Figure 4:
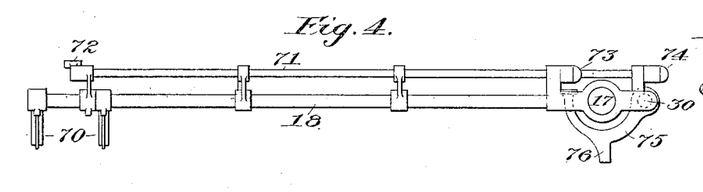
Figs. 4, 5, 6, 7, and 26 are detail views of the mechanism for transporting the bottles from the washing mechanism to the drain-off mechanism, Fig. 4 being an elevation, Fig. 5 a plan, Fig. 6 an end view, Fig. 7 a transverse section, and Fig. 26 a side elevation.
Figure 5:
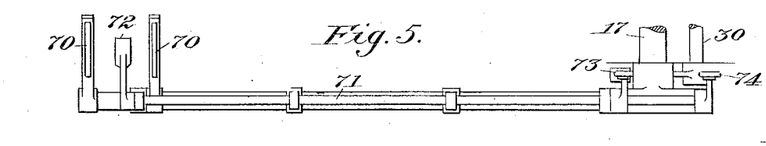
Figure 6:
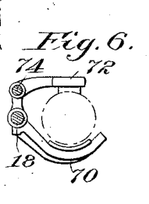

Between pulley 6 and gear-wheel 2 is mounted on axle 3 an eccentric 5, Fig. 3, which is connected with rod 31, Figs. 1 and 10, which in turn is in jointed connection through bar 84 with the carriage mentioned in the description of the introduction mechanism and which serves for carrying the bottles through the scraping apparatus to the lifting apparatus.

Figure 2:
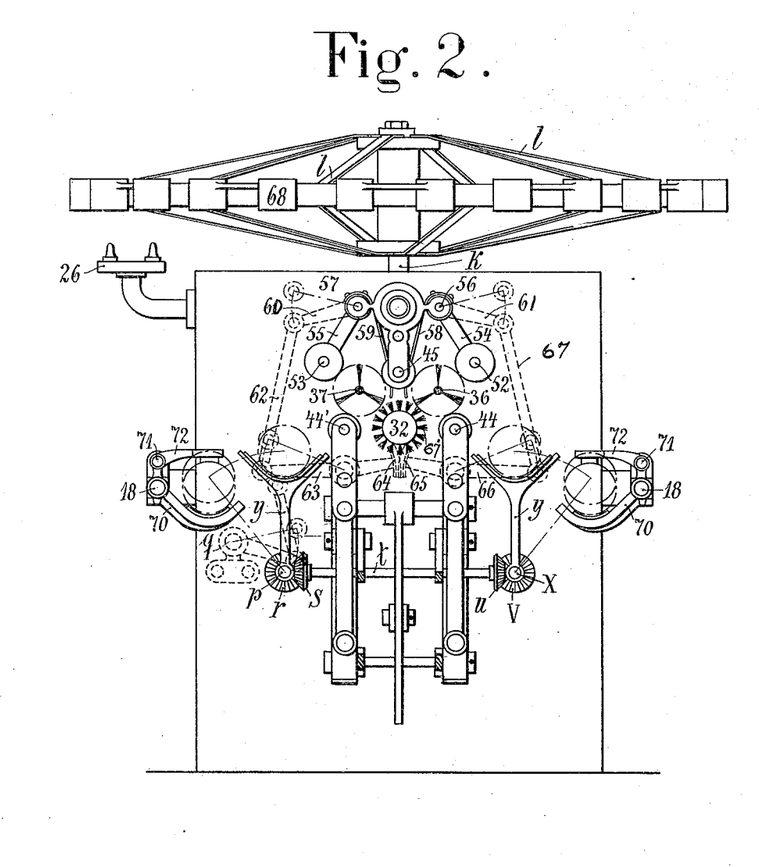
Fig. 2, an end elevation of the machine.
Figure 8:
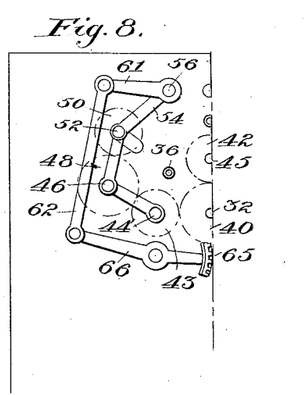
Fig. 8 is a diagrammatic elevation of the mechanism on the inner face of one half of the front wall of the machine.
Figure 23:
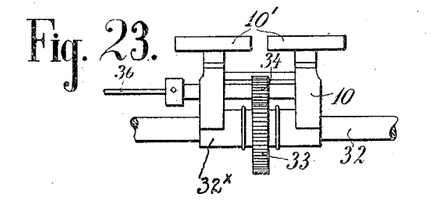
Figure 24:
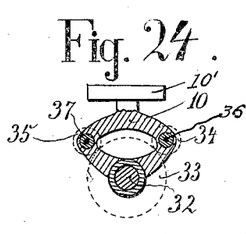
Figure 25:
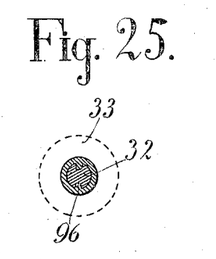

Independent of all earlier-mentioned motor parts an axle 32, Figs. 1, 22, 23, 24, and 25, is mounted in the framework of the machine and is rotated by a special belt engaging pulley $32'$, fixed thereon. This axle is supplied with a sleeve $32^\times$, movable along but rotating therewith by means of a tongue-and-groove connection. (See Fig. 25.) On said sleeve is mounted a gear-wheel 33, which rotates therewith. Engaging with and movable on said sleeve $32^\times$, as illustrated in Figs. 23 and 24, is a brush-guide 10, provided with two rollers 10', which engage the guiding-strip 38. On either side of said brush-guide is provided bearings for shafts 36 and 37, (see Figs. 22, 23, and 24,) on which are mounted, respectively, pinions 34 and 35, said shafts being provided at their other ends with suitable brushes which serve for cleansing the interior of the bottles. During the backward and forward movement of brush-guide 10, which is effected by the lever connection 9, as previously stated, the guidance thereof is effected by the engagement of rollers 10' with said strips 38, which latter also guide rod 12 by means of rollers 12' engaging therewith, (see Fig. 19,) and during this reciprocation gear-wheel 33, meshing with pinions 34 and 35, continuously rotates the axles 36 and 37 and the brushes mounted thereon. The axle 32 is, furthermore, supplied with a cog-wheel 40, Figs. 1, 3, and 9, meshing with three cog-wheels 41, 42, and 43, mounted on axles 44, 45, and 44', Figs. 2, 8, and 9. Each of these axles, which have their bearings in the front wall of the machine and in brackets screwed thereto, is supplied with a pair of rubber rollers. Axles 44 and 44' are linked to axles 47 and 46, which are supplied with cog-wheels 48 and 49, Figs. 8 and 9, and these mesh in turn with cog-wheels 50 and 51, the axles of which are supplied with rubber rollers. In this way a bed of three rollers is made for each bottle, and the rotation of these rollers produce the rotation of the bottles. The axles 46 and 52, as well as 47 and 53, are linked together. These axles are loose—that is, they have no bearing in the machine-wall—but the axles 52 and 53 are by means of the arms 54 and 55 connected to the fixed axles 56 and 57, Figs. 8 and 9, supplied with the springs 58 and 59, Fig. 2. The arms 54 and 55 each form one arm of an angle-lever, the other arm of which is 60 and 61. Arm 61 is by means of rod 67 jointed to the two-armed lever 63, which in turn is connected by link 100 with an arm 101 on the above-mentioned axle $q$, Figs. 1, 2, and 9. As stated above, this axle has a slight rotary motion, which motion by means of the described lever connection is transmitted to the axle 57, causing a side swing of the axle 53, with the rollers fixed on it, and the spring 59, as shown in Fig. 2, this latter engaging with and ejecting the bottles from between the rollers and causing them to drop into the cradle $y$, after which the roller and spring assumes its first position. This movement is transmitted to the other side by means of the lever 63, the other end of which is supplied with a small toothed sector 64, Fig. 9, meshing with toothed sector 65, Fig. 8, on lever 66, connected to arm 61 by a rod 62, as shown in Fig. 8. Finally, axle 32 is on its free end supplied with a large peculiarly-shaped rotating brush or scrubber 67', Figs. 1, 2, and 3, serving to fit and clean the exterior of the bottles.

The drain-off apparatus $l$, Figs. 1 and 3, supported by the vertical axle $k$, Figs. 1 and 3, consists of a wheel-box on which is fixed twenty-four bottle-shaped holders 68. In these holders the bottles are caught when freed from the transporters in the vertical position of the latter.

Figure 26:
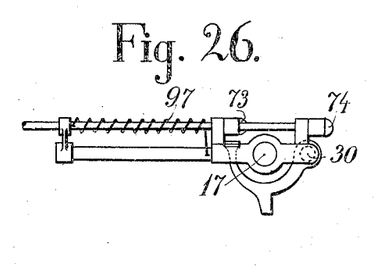

The transporters consist of the arms 18, Figs. 1, 2, 3, 4, 5, 6, and 7, fixed on the ends of the axle 17, which is also connected with the counterweight 69, Fig. 1. In their free ends the arms 18 are supplied with beds 70, Figs. 1, 2, 3, 4, 5, and 6, for the bottles. Along the arms 18 are fixed rods 71, capable of turning parallel with arms 18 and supplied with arms 72, adapted to engage the upper sides of the bottles and being normally kept closed by springs 97, (see Fig. 26,) thereby retaining the bottles during their travel from the cradle $y$ to the drain-off apparatus $l$. Each of the rods 71 is at the back supplied with two stops 73 and 74, Figs. 1, 3, 4, 5, and 7. The axle 30 is at each end supplied with a semicircular-shaped latch 75, Fig. 1, with a turned-down portion 76. When the transporter is in its horizontal position, the forward end of latch 75 will actuate stop 73, causing rod 71 to turn, thus elevating the arms 72 in front, so that the bottles may be laid on the bed. During the movement of the transporters the arm engaging the upper side of the bottle is closed; but when the transporter has gained its vertical position the stop 74 will be actuated by the portion 76, causing the rod 71 to turn again, disengaging arm 72 from contact with the bottle and permitting the bottle to drop into the receptacle on the wheel-box.

Figure 11:
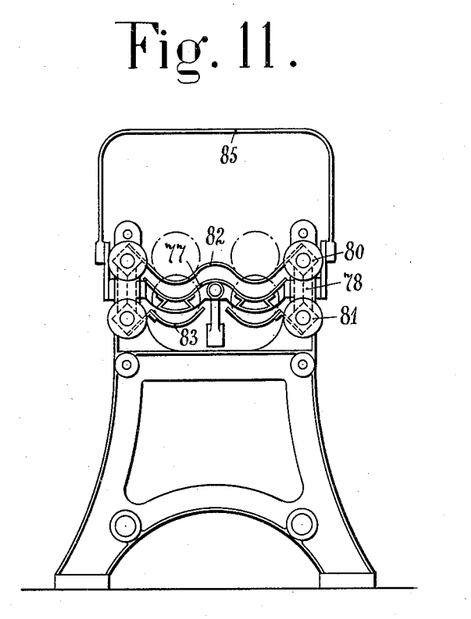
Fig. 11 is an end view, Fig. 14 a side elevation, and Fig. 15 a plan view, of the bottle-feed mechanism.
Figure 13:
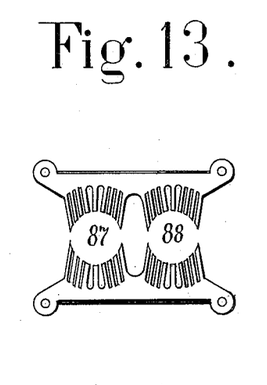
Fig. 13 is a detail view of the scrapers for removing labels and the like from the bottles.
Figure 14:
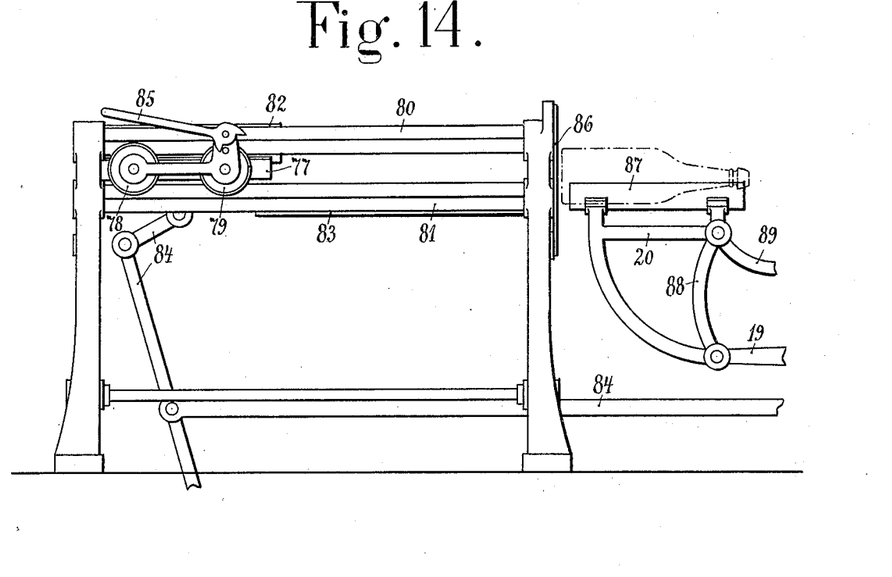
Figure 15:
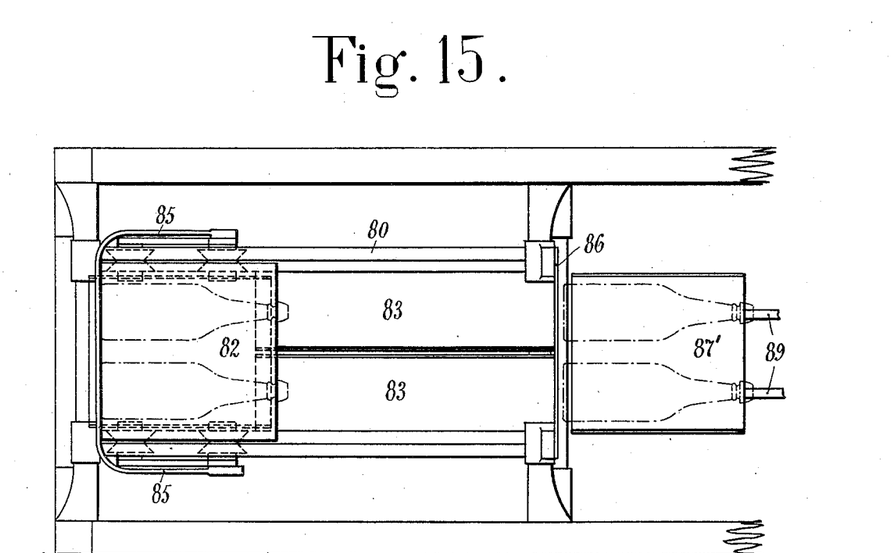

The introduction mechanism consists of three main parts—the carriage, (or sledge,) the lifting apparatus, and the depending arms—as described above. The carriage, Figs. 11, 14, and 15, consists of a body 77 with beds for two bottles, the carriage being movable on wheels, of which only two, 78 and 79, are seen in Fig. 14. The wheels engage between rails 80 and 81, Fig. 11. These rails support in front and rear, respectively, the fixed top body 82 and the fixed bottom body 83, Figs. 11, 14, and 15. The carriage, which by lever connection 84 is connected with the above-mentioned rod 31 and receives from it a backward and forward motion, is above supplied with a bow 85, which through its own weight tends to grasp the bottom of the bottles. The workman places the bottles on the fixed top body so that the bow 85 falls down behind the bottom of the bottles. Through the movement of the carriage toward the machine the bottles are dragged along the top body until they drop from it onto the carriage. Upon the movement of the carriage away from the machine the bottles will not follow, because they touch the edge of the top body. They consequently drop down onto the lower body 83, from where at the next movement of the carriage toward the machine they are pushed through the scraping apparatus 86, Figs. 13, 14, and 15, and onto the lifting apparatus. The scraping apparatus, Fig. 13, fixed at the back of the frame supporting the carriage, consists of two metal plates forming two holes 87 and 88. These metal plates are supplied with notches or teeth which scrape off labels, &c., as the bottles pass therethrough. The lifting apparatus 20, Fig. 1, consists, likewise, of a body 87' with beds for two bottles. This body is supported by a bracket in joint connection with the parallelogram 19, 88, and 89, this last-named rod pivoting on a suitable axis $21^a$. (See Fig. 1.) As previously stated, the end of the rod 19 connected with the bracket moves up and down, causing the body 87' with the bottles to move from the position behind the scraping apparatus 86 up to a position in front of the arms 13, which carry the bottles into the flush mechanism, after which the lifting apparatus goes down again.

The operation of the machine is as follows: The bottles intended for cleansing, which are previously soaked and partly filled with water, are placed on the upper body 82 with their necks toward the machine and are pushed so far in that the bow 85 falls down behind them. The carriage will drag the bottles forward, and after having passed the upper body they drop down onto the carriage and, through the movement of the carriage away from the machine, down onto the lower body 83. On the next movement of the carriage toward the machine they are carried through the scraping apparatus 86, where labels, &c., are scraped off. They are then delivered to the beds 87' on the lifting apparatus 20, which is in its lowermost position. The lifting apparatus brings the bottles up between the arms 13 and the machine, and the arms 13 then force the bottles to the position shown in full lines in Fig. 1, where each bottle is carried in between three sets of rollers. These cause the bottles to rotate, the bottles being at the same time manipulated outside by the brush 67, Figs. 1, 2, and 3, while the perforated water-pipe is continually sprinkling water onto the bottles and the brush. The bottoms of the bottles are cleaned by the brushes fixed on the arms 13, and into the bottles, which, as stated above, are partly filled with water, are at the same time introduced the two rotating brushes 36 and 37, Figs. 1, 2, 3, and 22. Now the rod 12 with the arms 13 moves away from the machine while the brush-guide 10 with the two rotating brushes 36 and 37 moves backward, thereby pulling the brushes out of the bottles. By means previously described the axles 56 and 57 now move, causing the rollers 52 and 53 and the springs connected therewith to swing to the side. Through this opening the bottles will be carried out sidewise from between the rollers and drop down into the cradles $y$, which are in a vertical position. The cradles oscillate into a slanting position and deliver the bottles to the transporters, the arms 72 clasping the bottles. The transporters 18 now move to a vertical position, during which movement the bottles, continually held firmly by the claws, are emptied. When the arms have reached a vertical position, the claws are opened by means of the described devices 74 and 76, Figs. 1, 4, 5, and 7, causing the bottles to slide out and to be caught by the holders 68. Through the rotation of wheel 1 the bottles are carried to the rinsing device 26. (Shown in Figs. 1 and 3.) Through the nozzles of this device jets of water are injected into the bottles. The bottles then move on, drain off, and are removed. In the meantime the transporters have returned to a horizontal position and are supplied with fresh bottles.

The rotating movement of all rollers and brushes in the flush mechanism is quite independent of the rest of the movement, the latter being produced by means of driving-axle $a$ while the former is produced by the axle 32. The advantage of this is that the brush and flush mechanism may be in activity while the rest of the movement producing the transport of the bottles from one position to another may be stopped by a device (not shown) when a bottle is in the flush mechanism, making it possible to subject very dirty bottles to a more thorough manipulation.

Having thus described my invention, I claim as new and desire to secure by Letters Patent—

1. In a bottle-cleaning machine, the combination of bottle-washing mechanism, a carrier for delivering the bottles thereto in succession, and scraping means acting on the bottles in their passage to the carrier for removing labels and the like.

2. In a bottle-cleaning machine, the combination of bottle-washing mechanism, a carrier for delivering the bottles thereto in succession, bottle-feed mechanism for delivering the bottles to the carrier in succession the same comprising a support on which the bottles are deposited by an operator and a reciprocating pusher for removing the bottles from the table and advancing them through the feed mechanism to the carrier.

3. In a bottle-cleaning machine, the combination of bottle-washing mechanism, an upwardly-swinging carrier for delivering the bottles thereto in succession and feed mechanism comprising a pusher for delivering the bottles in succession onto the carrier.

4. In a bottle-cleaning machine, washing mechanism comprising rollers engaging the bottle at three points around its surface and supporting the bottle during the washing operation, and means for rotating one of the rollers to impart a rotary motion to the bottle.

5. In a bottle-cleaning machine, washing mechanism comprising rollers engaging and rotating the bottle during the cleansing operation and means for automatically shifting one of said rollers to permit of the removal of the bottle.

6. In a bottle-cleaning machine, washing mechanism comprising rollers engaging and rotating the bottle during the cleansing operation and means for automatically shifting one of the rollers and means for ejecting the bottle from said washing mechanism.

7. In a bottle-cleaning machine, washing mechanism comprising a series of rollers for supporting and rotating the bottle during the washing operation, gearing for imparting rotary motion to one of the rollers, a reciprocating brush adapted to be inserted into the bottle to wash the interior thereof, and means for shifting one of the rollers to engage the bottle and for reciprocating the brush to insert it into the bottle and for shifting the roller in the opposite direction to permit withdrawal of the bottle and for simultaneously reciprocating the brush in the opposite direction to withdraw it from the bottle.

8. In a bottle-cleaning machine, washing mechanism comprising a series of rollers for supporting and rotating the bottle during the washing operation, gearing for imparting rotary motion to one of the rollers, a reciprocating brush adapted to be inserted into the bottle to wash the interior thereof, means for shifting one of the rollers to engage the bottle and for reciprocating the brush to insert it into the bottle and for shifting the roller in the opposite direction to permit withdrawal of the bottle and for simultaneously reciprocating the brush in the opposite direction to withdraw it from the bottle, and an ejector for automatically ejecting the bottle from the rollers upon shifting of one roller and the withdrawal of the brush.

9. In a bottle-cleaning machine, washing mechanism comprising bottle-rotating means, a carrier adapted to convey the bottle to said bottle-rotating means and a reciprocating arm adapted to deliver the bottle from the carrier into engagement with said bottle-rotating means.

10. In a bottle-cleaning machine, washing mechanism comprising bottle-rotating means, a carrier adapted to convey the bottle to said bottle-rotating means, a reciprocating arm adapted to deliver the bottle from the carrier into engagement with said bottle-rotating means and a brush on the arm for cleaning the bottom of the bottle.

11. In a bottle-cleaning machine, washing mechanism comprising bottle-rotating means and rotating brushes adapted to engage the interior and exterior of the bottle, and connections for actuating said bottle and brush rotating means independently of the remainder of the mechanism.

12. In a bottle-cleaning machine, washing mechanism, a drain-off apparatus, a transporter for conveying the bottle to said drain-off apparatus, and a shifter for passing the bottle from the washing mechanism to the transporter.

13. In a bottle-cleaning machine, washing mechanism, a drain-off apparatus, a transporter for conveying the bottle to said drain-off apparatus, and an oscillating shifter for passing the bottle from the washing mechanism to the transporter.

14. In a bottle-cleaning machine, the combination of washing means, a drain-off apparatus and an upwardly-swinging transporter for delivering the bottle to the drain-off apparatus.

15. In a bottle-cleaning machine, the combination of washing means, a drain-off apparatus and an upwardly-swinging transporter for delivering the bottle to the drain-off apparatus, comprising a rest for the bottle and a grip for engaging the bottle, and means for automatically operating the grip to hold and release the bottle.

16. In a bottle-cleaning machine, the combination of washing means, a drain-off apparatus, a transporter for delivering the bottles to the drain-off apparatus and water-spraying means adjacent to said drain-off apparatus for projecting a stream of water into the bottles deposited thereon to effect a final rinsing thereof.

17. In a bottle-cleaning machine, a carrier, feeding mechanism for delivering the bottles to the carrier, washing means to which the bottles are conveyed by the carrier, a drain-off apparatus and a transporter for carrying the bottles from said washing means to the drain-off apparatus.

18. In a bottle-cleaning machine, feeding mechanism, washing mechanism, a carrier for delivering the bottles from the feed mechanism to said washing mechanism, scraping means acting on the bottles in their passage to the carrier for removing labels and the like, a drain-off apparatus, a transporter for conveying the bottles to said drain-off apparatus and a shifter for passing the bottles from said washing means to said transporter.

In testimony that I claim the foregoing as my invention I have signed my name in presence of two subscribing witnesses.

HILMAR TERSLING.

Witnesses:
  Yiggo Blom,
  Fleming G. Meyer.